April 7, 1964

A. E. FILANGERI 3,127,811

POSITION MONITOR

Filed Feb. 1, 1960

INVENTOR
*Anthony E. Filangeri*

BY

ATTORNEYS

April 7, 1964  A. E. FILANGERI  3,127,811
POSITION MONITOR
Filed Feb. 1, 1960                     2 Sheets-Sheet 2
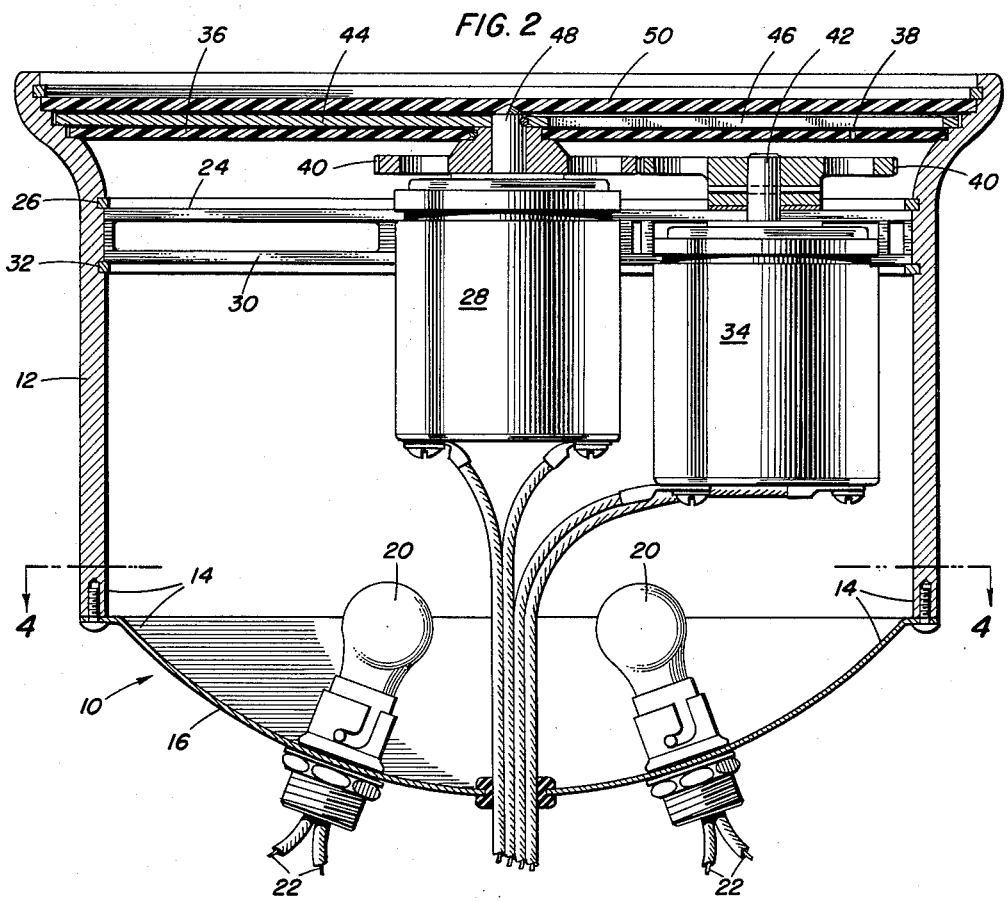
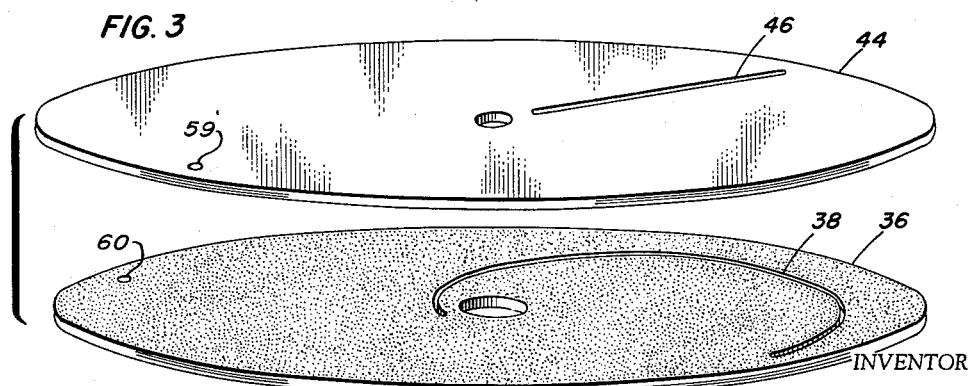
INVENTOR
Anthony E. Filangeri

United States Patent Office 3,127,811
Patented Apr. 7, 1964

3,127,811
POSITION MONITOR
Anthony E. Filangeri, Silver Spring, Md., assignor, by mesne assignments, to the United States of America as represented by the Secretary of the Navy
Filed Feb. 1, 1960, Ser. No. 6,080
5 Claims. (Cl. 89—134)

This invention relates to position monitors and more particularly to a position monitor for indicating remotely at all times the position of an object which is movable in two planes of movement.

In the shipboard use of objects which are movable in train and elevation such as guns or missile launchers, it is necessary that the position of these movable objects be indicated at a remote position when the objects are in use. The practice in the past has been generally to employ a monitoring board made up of a plurality of different indicators and scales which indicate each phase of movement of the object separately from every other phase. In the use of the monitoring board of the past devices, it was necessary to have highly trained technical personnel to read the separate indicators and scales and gather the information therefrom. The information which was gathered from the different scales and indicators must then be consolidated into the indication of the launcher position.

In the present invention, the movement of the object both in train and in elevation is consolidated and projected on one scale. Since both the train and elevation movement of the object is consolidated as it is projected onto a single scale, the position of the object is easily determinable at any given time. The monitor of the present invention also indicates on the scale the operation of the firing cutout mechanism of the gun or launcher.

The use of the present invention obviates the necessity of having highly trained technical personnel and simplifies the monitoring of guns and missile launchers used aboard ships.

Accordingly, it is an object of this invention to indicate remotely the position of a gun or missile launcher which is movable in train and elevation on one scale which is calibrated in degrees train and elevation.

It is a further object of this invention to indicate on the same scale where the position of the gun or launcher is shown whether or not the firing cutout mechanism is operating properly.

A still further object is to indicate on the same scale where the position of the gun or launcher is shown and the operation of the firing cutout is indicated when the gun or missile launcher is about to be pointed at some of the superstructure of the ship.

Other objects and many of the attendant advantages of this invention will be readily appreciated as the same becomes better understood by reference to the following detailed description when considered in connection with the accompanying drawings wherein:

FIG. 2 is a sectional view taken on line 2—2 of FIG. 1;

FIG. 3 is a perspective view showing the train and elevation movement indicating plates.

Figure 1:
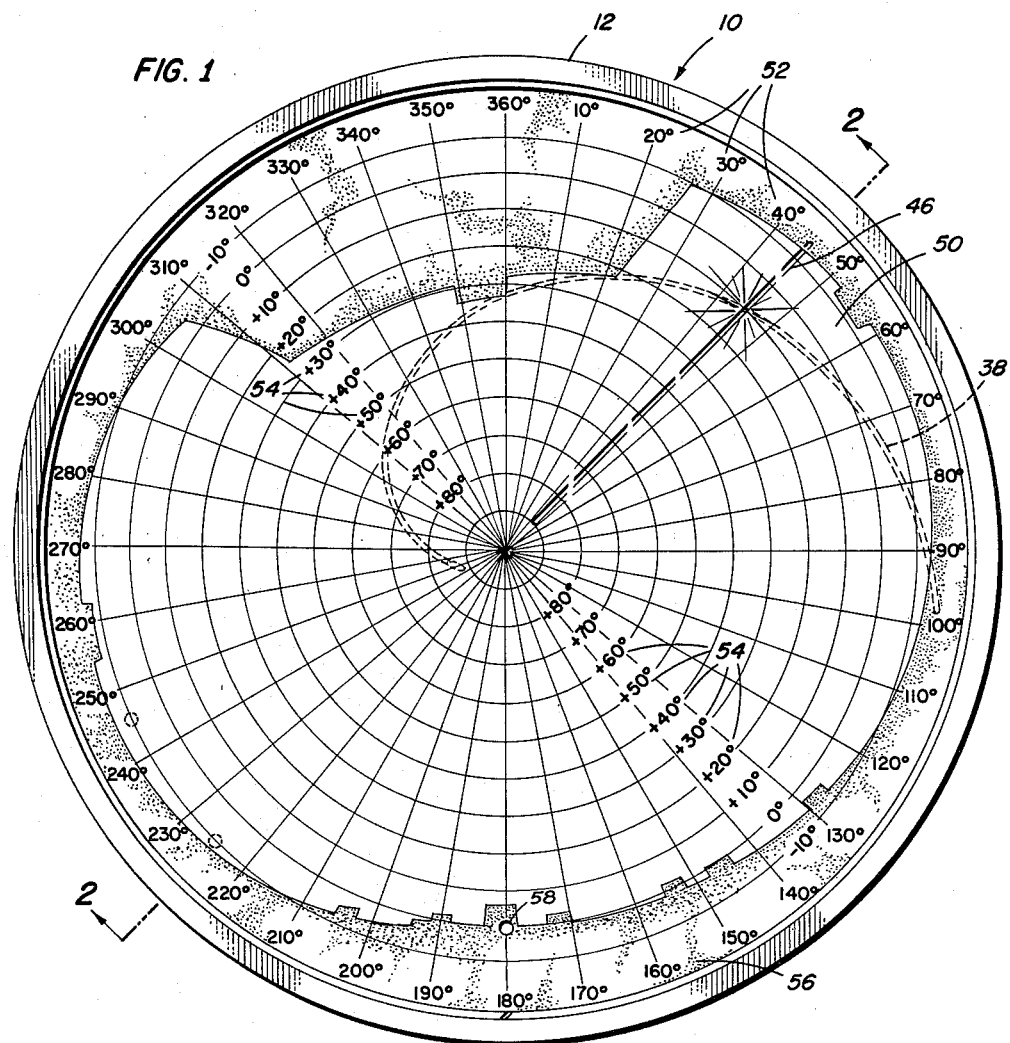
FIG. 1 is a plan of the monitor showing the scale calibrated in degrees train and elevation and having a non-safe firing zone thereon.
Figure 4:
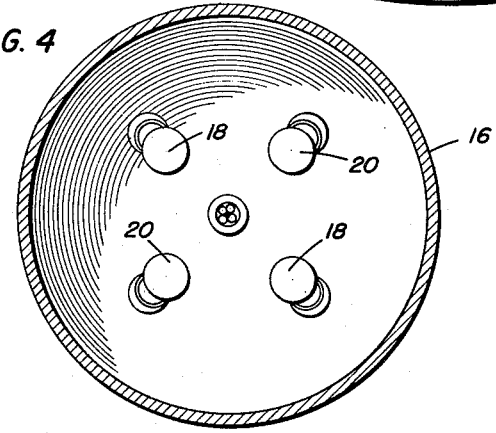
FIG. 4 is a sectional view taken on line 4—4 of FIG. 2.

Referring to FIG. 2 the monitor 10 comprises a housing 12 made up of any suitable material. The housing 12 has a reflecting surface 14 along the inside thereof. Contained within the housing 12 and mounted on the back portion 16 thereof are red lamp assemblies 18 and white lamp assemblies 20. These lamp assemblies 18 and 20 are wired through suitable wiring 22 to the gun or missile launcher firing cutout mechanism, not shown.

When the gun or launcher is pointing into a zone into which it is safe to fire, the firing cutout mechanism will not be actuated and current will be applied to the white light assembly which will glow and the red lights will be extinguished. Consequently, the light which appears on the scale will be white when it is safe to fire the gun or missile. Should the gun or missile launcher move to a position where it is not safe to fire, the firing cutout mechanism will be energized and the white light assembly will be extinguished and current will be applied to the red light assembly. Consequently, when it is not safe to fire the gun or missile and the firing cutout mechanism is operating properly the light which appears on the scale will be red.

Mounted within the housing 12 is a bracket 24 held in place by a retaining ring 26. A synchro receiver 28 is mounted on bracket 24 within housing 12 to receive signals from a synchro transmitter unit, not shown, located at the launcher, also not shown. A second bracket 30 is mounted in the housing 12 by means of a retaining ring 32. A second synchro receiver 34 is mounted on bracket 30 within housing 12 to receive signals from both an elevation and a train synchro transmitter, not shown, located at the launcher. The synchro transmitter units, not shown, located at the launcher send signals to the synchro receivers as the launcher moves either in train or elevation.

A circular plate 36, FIG. 3, having a spiral slot 38 machined on its surface is connected through suitable gearing 40 to the output shaft 42 of the synchro receiver 34. As the gun or launcher moves in both train and elevation, the train and elevation synchro transmitters, not shown, transmit signals to the synchro receiver 34. The synchro receiver 34 then rotates the plate 36 through gearing 40 in synchronism with the said training and elevation movement of the gun or launcher.

A second circular plate 44, FIG. 3, having a straight radial slot 46 cut therein is fixed to the output shaft 48 of the synchro receiver 28. As the gun or launcher moves in train, the train synchro transmitter, not shown, transmits signals which are received by the synchro receiver 28. The synchro receiver 28 then rotates the circular plate 44 in synchronism with the movement of the gun or launcher in train.

A third circular plate 50, see FIGS. 1 and 2, is mounted in housing 12 in superposed relationship to the circular plates 36 and 44. The circular plate 50 is calibrated in degrees train 52 and degrees elevation 54 and has a polar plot 56 corresponding to the non-safe firing zone of the ship as seen by the gun or launcher inscribed thereon.

A self-checking feature is included in the monitor. The monitor can be checked for alignment each time the launcher returns to load position. If the monitor is in proper alignment, the aligning indicium 58, which is located at a position on plate 50 corresponding to the load position of the launcher, will be lighted. This is accomplished by positioning apertures 59 and 60 respectively in circular plates 44 and 36 in such a manner that they are in alignment when the launcher is in load position thus lighting indicium 58. As disclosed herein, the load position of the launcher is at 0 degrees elevation and 180 degrees train. It will be apparent that for other launchers the load position may be at a position other than 0 degrees elevation and 180 degrees train, and in such arrangements the location of indicium 58 and apertures 59 and 60 may be aligned to correspond therewith.

The operation of the launcher position monitor will now be described. Assuming the center of a circle to indicate the gun or launcher pivot point in train, a straight radial ray displaced about this circle would indicate the position of the gun or launcher as it moves in train. If a portion of this ray were to be sharply focused into a bright spot, the said spot could be displaced along the length of the train ray to indicate the position of the gun or launcher as it moves in elevation.

As the launcher moves in train, train signals are sent to both the train and elevation synchro receivers 28 and 34 which rotate the slotted plates 36 and 44 as a unit. The resulting ray of light with the sharply focused bright spot is displaced radially indicating the train position of the launcher. Both plates being synchronized, there is no relative displacement between them and consequently no displacement of the bright spot on the radial ray. When the launcher changes position in elevation, for example, the elevation signal is sent only to the elevation synchro receiver 34. This signal added to the train signal causes the elevation plate 36 to be displaced relative to the train plate 44 thereby displacing the spot on the ray to indicate a new elevation angle.

The resultant display is a radial beam containing a bright spot which always indicates the position of the launcher in train and elevation. The spot and ray is displayed as white whenever the launcher is pointed to a safe firing zone. As the spot moves into an unsafe firing zone, the firing cutout cam changes the color to red indicating the firing cutout is in working order.

The remote operator is thus able to tell at a glance what the launcher attitude is at all times, i.e. whether the launcher is in a safe or unsafe firing zone, and whether the firing cutout mechanism is operating correctly.

This unit may remain wired into the circuit of the launcher at all times to monitor the launcher or gun position in tactical as well as exercise operation. Simply by changing the polar plot 56, monitor 10 may be adapted to any gun or launching system in any location on any vessel for present and future installations.

The firing cutout mechanism mentioned herein is any of the various types well-known in the art. Examples of the firing cutout mechanisms in common use are described in Naval Ordnance and Gunnery, volume 1, pages 158–160 and volume 2, page 211. Both volumes were published in 1955 by the Government Printing Office and are sold to the public by the Superintendent of Documents.

Obviously many modifications and variations of the present invention are possible in the light of the above teachings. It is therefore to be understood that within the scope of the appended claims the invention may be practiced otherwise than as specifically described.

What is claimed is:

1. In a missile launching system having a launcher movable in train nad elevation and a firing cutout mechanism, means for indicating the position of the launcher at any given time during its train and elevation movement, said means including visible warning means for indicating movement of the launcher into an unsafe-to-fire zone and the position of the launcher therein, said warning means being operable only in response to the operation of the firing cutout mechanism a graduated scale, said scale including train, elevation and unsafe-to-fire indicia thereon, means for projecting said position indication on said graduated scale, and means for checking the alignment of said indicating means with the position of the launcher each time the launcher is returned to the loading position.

2. In a missile launching system having a launcher mounted for movement in train and elevation and a firing cutout mechanism for preventing the launching of missiles when the launcher is moved into an unsafe-to-fire zone, means for visibly indicating the position of said launcher at any given time during said train and elevation movement and rendered inoperative in response to the operation of the firing cutout mechanism, said means including a scale graduated in degrees of train and elevation, and unsafe-to-fire indicia thereon, means for visibly indicating the position of the launcher within unsafe-to-fire zones and operable in response to the operation of the firing cutout mechanism, and means rotating in synchronism with said train and elevation movement for indicating the position of said launcher on said scale, the operation of said indicating means enabling the proper operation of the firing cutout mechanism and the position of the launcher to be continually monitored.

3. A monitor for indicating the position of an object movable in train and elevation comprising a scale graduated in degrees of train and elevation, a first rotary, opaque plate having a spiral, transparent slot therein mounted adjacent said scale, a second rotary, opaque plate having a straight, radial, transparent slot therein mounted between said first rotary plate and said scale, means for rotating said first rotary plate in synchronism with the train and elevation movement of said object, means for rotating said second rotary plate in synchronism with the training movement of said movable object, and a light source mounted on the side opposite of said rotary plates from said scale for supplying light through said slots to indicate the position of said movable object on said scale, and means for checking the alignment of said scale with the position of the object each time the object is moved to a pre-determined position.

4. A monitor for indicating the position of an object movable in train and elevation from an initial position and returnable thereto and comprising a housing, a scale graduated in degrees of train and elevation and having pre-determined zones masked thereon, said scale being mounted in said housing, a first rotary, opaque plate having a spiral, transparent slot therein mounted in said housing adjacent said scale, a second rotary, opaque plate having a straight, radial, transparent slot therein mounted in said housing between said first rotary plate and said scale, first synchro receiver means for rotating said first rotary plate in synchronism with the train and elevation movement of said object, the second synchro receiver means rotating said second rotary plate in synchronism with the training movement of said object, a light source mounted on the opposite side of said rotary plates from said scale for supplying light through said slot to indicate the position of said object on said scale, said light source having two different colored lights adapted to indicate when the object is positioned in one of said pre-determined zones, and means for checking the alignment of said scale and plates with the position of the object each time the latter is moved to the initial position.

5. In a missile launching system having a launcher mounted for movement in train and elevation from an initial position and returnable thereto, means for indicating the position of the launcher at all times during train and elevation movements thereof, said means including a scale graduated in degrees of train and elevation, first rotary means including means defining a spiral transparent slot movable in synchronism with both train and elevation movements of the launcher, second rotary means including means defining a straight, radial, transparent slot movable in synchronism with the training movement of the launcher, a light source for supplying light through said slots to said scale in accordance with the rotation of said first and second rotary means on said scale to provide an indication of the changes in position of the launcher, and means for verifying the alignment of said scale and rotary means with the position of the launcher each time the latter is moved to the initial position.

References Cited in the file of this patent

UNITED STATES PATENTS

| | | |
|---|---|---|
| 2,479,569 | Harschel | Aug. 23, 1949 |
| 2,528,142 | Herzlinger | Oct. 31, 1950 |
| 2,803,061 | Jortberg | Aug. 20, 1957 |